United States Patent [19]

Lee

[11] Patent Number: 5,025,308

[45] Date of Patent: Jun. 18, 1991

[54] ZEBRA SIGNAL GENERATING CIRCUIT OF A VIDEO CAMERA

[75] Inventor: Hyo-Sam Lee, Seoul, Rep. of Korea

[73] Assignee: SamSung Electronics Co., Ltd., Suwon, Rep. of Korea

[21] Appl. No.: 505,264

[22] Filed: Apr. 6, 1990

[51] Int. Cl.$^5$ ............................................. H04N 17/02
[52] U.S. Cl. ...................................... 358/10; 358/139
[58] Field of Search ................................. 358/10, 139

[56]  References Cited

U.S. PATENT DOCUMENTS

| | | |
|---|---|---|
| 2,580,083 | 12/1951 | Dobra . |
| 2,858,368 | 10/1958 | Kenneday . |
| 3,188,383 | 6/1965 | Rebeschini . |
| 3,529,079 | 9/1970 | Moskovitz . |
| 3,534,155 | 10/1970 | Rhodes . |
| 3,730,984 | 5/1973 | Smith . |
| 3,972,065 | 7/1976 | Heiges . |
| 4,388,637 | 6/1983 | Blair . |
| 4,435,732 | 3/1984 | Hyatt ................................. 358/254 |
| 4,495,519 | 1/1985 | Wahlquist . |
| 4,647,197 | 3/1987 | Kitaya ................................. 358/106 |
| 4,672,457 | 6/1987 | Hyatt ................................... 358/60 |
| 4,739,396 | 4/1988 | Hyatt ................................... 358/60 |
| 4,772,951 | 9/1988 | Saito ............................... 358/213.11 |

Primary Examiner—Howard W. Britton
Attorney, Agent, or Firm—Robert E. Bushnell

[57] ABSTRACT

A quotation or "comb teeth" pattern signal generating circuit of a video camera capable of obtaining a better quality of picture screen image by selecting the zebra pattern able to be seen by each stage by dividing the video signal gain band into each stage in the video camera. The invention includes: video signal amplifying means, NAM video signal means, video signal integrating means, zebra signal generating means, zebra signal control means, and monitor signal selecting means. According to the invention, since the picture screen condition and the light quantity state are easily caught in each gain band, a better quality of picture screen image is obtained, and separate measuring instrumentation or a master monitor is not required in order to measure the picture screen condition or the light quantity when taking a picture of a field location as in the prior art.

5 Claims, 3 Drawing Sheets

ZEBRA SIGNAL GENERATING CIRCUIT OF A VIDEO CAMERA

BACKGROUND OF THE INVENTION

This invention relates to a quotation marks or "comb teeth" pattern signal generating circuit of a video camera, and in particular to a zebra signal generating circuit of a video camera in which, an electronic view finder (which is abbreviated as E.V.F) is utilized and especially when taking photographs at a field location, the gain band of the video signal is divided into stages the user is able to see and by selecting the appropriate zebra pattern among these stages, an improved video image quality can be obtained.

In general, the zebra pattern means a comb teeth pattern, and this pattern is made to couple to the video signal by dividing the frequency down to a quarter of the 3.58 MHZ carrier which is the sub-carrier of the color signal, since the sub-carrier signal is inverted at every 1 Hz the comb teeth pattern appears in the picture screen. Accordingly, the visual status of the object becomes possible to observe in the electronic view finder of the video camera.

Therefore, when pressing the white balance of a video camera, the zebra signal appears and is produced up to the third stage from the white in the gray scale chart.

The zebra signal is conventionally produced when the video signal is a light quantity of over 100 IRE, the zebra signal can indicate the state and range of incident light quantity with regard to the surrounding environment during picture taking and is useful to check the state of the camera, and is used for making a pertinent video signal and photograph by controlling the lens iris in response to the zebra signal. However, the video camera using a conventional zebra pattern is structured to merely warn about the state or light quantity of the picture screen by inputting the zebra pattern when above a certain specific value i.e., only the portion of the light quantity being directed, and being designed not to be able to observe the state and light quantity of the picture screen when below the specific value, and therefore, when taking a picture of the field location with a video camera, because the state and scope of the light quantity is not possible to observe without a measuring instrument or master monitor, there is a problem that a picture of good quality is hard to obtain with only the electronic view finder scanned with black and white.

SUMMARY OF THE INVENTION

Therefore, the present invention is designed to solve the problems as aforementioned, and includes: video signal amplifying means for amplifying the inputted video signal, non additive video signal means for dividing the inputted video signal into a number of gain bands, video signal integrating means for integrating the amplified signal from said video signal amplifying means, zebra signal generating means for generating the zebra signal, zebra signal control means for controlling the zebra signal generated from the zebra signal generating means, and monitor signal selecting means for selecting the view finder signal or monitor signal by the control signal; wherein the state and light quantity of picture screen are possible to observe by dividing the inputted video signal into a number of gain bands and making it possible to see then by selecting the zebra pattern of each and every said gain bands and thereby the state and light quantity are possible to observe, such that a good picture quality can be obtained by the user.

BRIEF DESCRIPTION OF THE DRAWINGS

Further objects and advantages of the invention will become apparent from reading the following description in conjunction with the accompanying drawings in which.

DETAILED DESCRIPTION OF THE INVENTION

Hereinafter, a preferred embodiment of the present invention will be described in detail with reference to the accompanying drawings.

Embodiments of present invention include but are not limited to:

video signal amplifying means A including but not limited to resistors R1-R6 and transistors TR1-TR3 for amplifying the inputted red, green, and blue video signals;

NAM video signal means B including but not limited to resistors R9-R13 and transistors TR4-TR6 for outputting the NAM video signal proportional to $(R+G+B)/3$ where the red, green, and blue signal is outputted from said video signal amplifying means A;

Video signal integrating means C including but not limited to resistors R7, R8, capacitors C1, C2, transistor TR7, and operational amplifier OP1 for integrating firstly and secondly the amplified signal from said video signal amplifying means A;

zebra signal generating means D including but not limited to zener diode ZD1, resistors R14-R16, capacitors C4, C5, and 4 bit counter integrated circuit IC1 for outputting the zebra signal by receiving the zebra control signal VZ from the zebra control terminal;

zebra signal control means E including but not limited to resistors R17-R30, diodes D2-D7, variable resistors VR1-VR4, comparators COMP1-COMP4, AND gates AND1-AND4, OR gate OR1, band selection switch SW1 and diode D8, switching circuit A utilizing resistors R24, R31, transistor TR8 and capacitor C3, for outputting the zebra signal in stages by comparing the zebra signal generated at said zebra signal generating means D with a reference voltage, and switching and controlling through the logic circuit; and monitor signal selecting means F for selecting and outputting the monitor signal or view finder signal by the control signal, by receiving the NAM video signal, outputted from the NAM video signal means B and red, green, and blue video amplified signals outputted from said video signal amplifying means A.

Operation and effect of the present invention constituted as aforementioned will be described in detail as followings.

Figure 1:
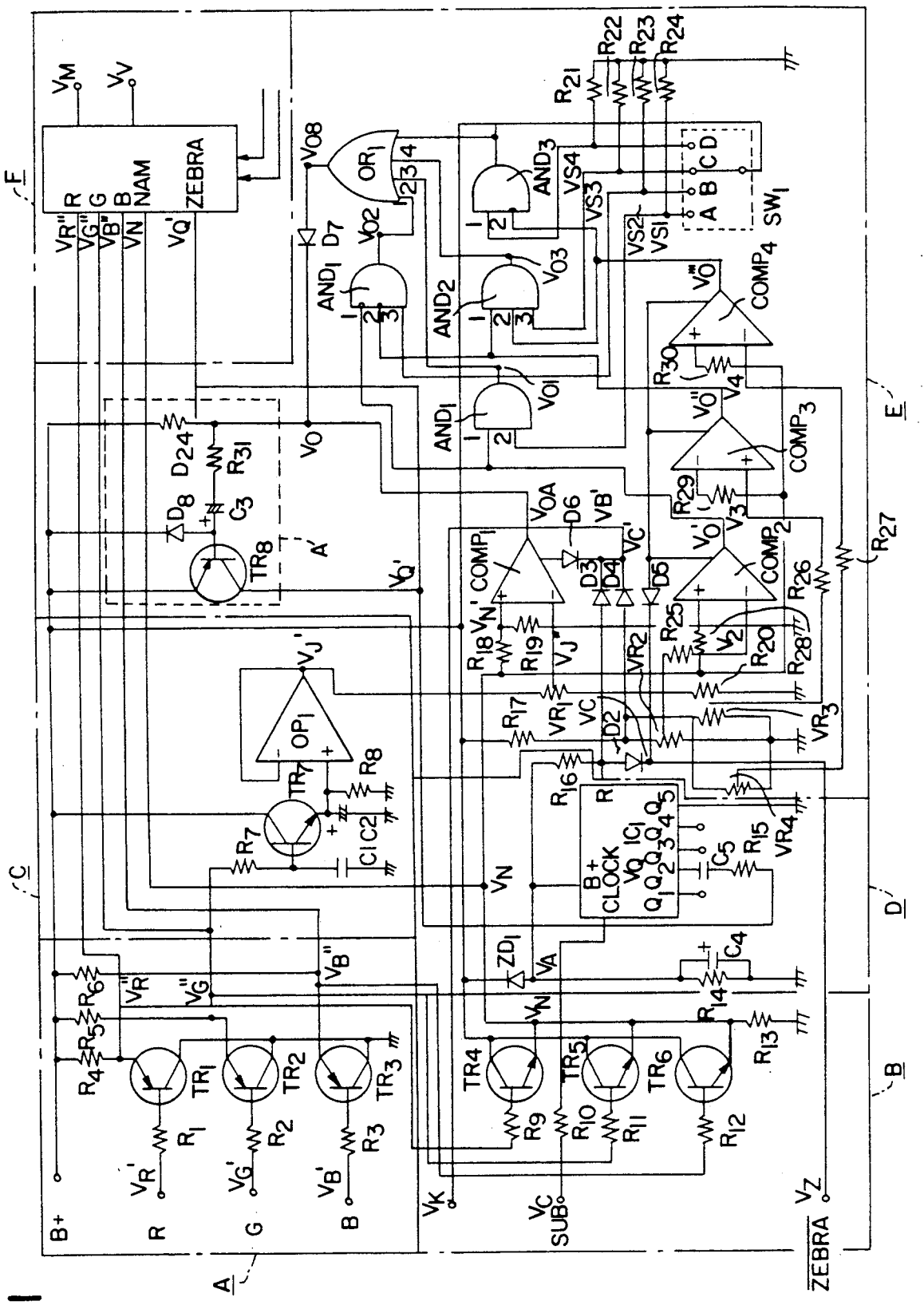
FIG. 1 is a circuit diagram of entirety of the zebra signal generating circuit of the present invention.
Figure 2A:
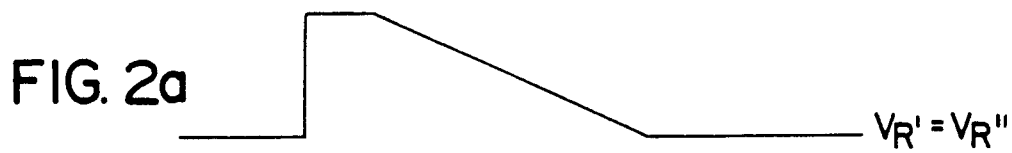
FIGS. 2a to 2i are wave form charts of the outputs from each stage of the zebra signal generating circuit and are used for purposes of explanation in the present invention.
Figure 2B:
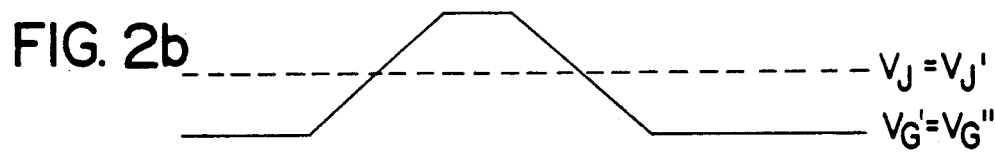
Figure 2C:
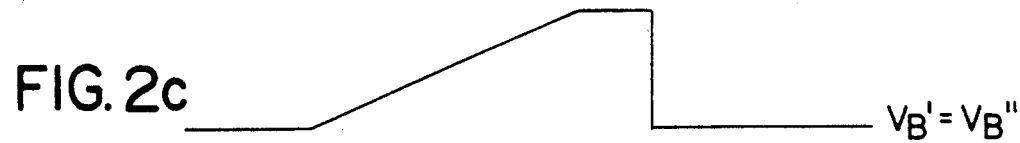

At first, when power supply voltage B+ is applied, the red, green, and blue signals inputted respectively to the video signal input terminals VR', VG', VB' within the interior of the video signal amplifying means A is applied respectively to the base terminals of the transistors TR1, TR2, and TR3 through each of the bias resistors R1, R2, and R3, the transistors TR1, TR2, and TR3 become the emitter followers and current amplify respectively the inputted red, green, and blue video signals VR', VG', and VB', and inputting respectively the red, green, and blue video signals VR", VG", and VB" as shown in FIGS. 2a, 2b, and 2c to the signal terminals R.G.B. within the interior of the monitor of the monitor signal selecting means F, at the same time, G video signal VG" of red, green, and blue video signals VR", VG", and VB" being current amplified at said video signal amplifying means A is integrated firstly by a resistor R7 and a capacitor C1 within the interior of the video signal integrating means C and then being integrated secondly by a transistor TR7, a capacitor C2 and a resistor R8, and thereafter current amplifying through the operational amplifier OP1 and outputting the output signal VJ' as shown in FIG. 2b.

Figure 2D:
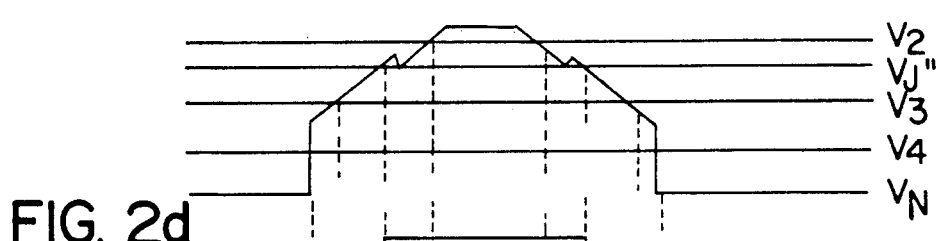

On the other hand, said current amplified R.G.B. video signals VR", VG", and VB" are applied respectively to the base terminals of the transistors TR4, TR5, and TR6 through each of the resistors R9, R11, and R12 within the interior of the NAM video signal means B, so that the transistors TR4, TR5, and TR6 become emitter follower with resistor R13 as a common ground, and outputting the NAM video signal $V_N$, as shown in FIG. 2d proportional to $(R+G+B)/3$.

Non-additive mixing; video signal $V_N$ outputted as is applied to the non-inversion (+) terminals of the comparators COMP1, COMP2, COMP4 through resistor R18, R28, and R30 respectively, within the interior of the zebra signal control means E, at the same time, being applied to the inversion (−) terminal of the comparator COMP3 through a resistor R29, and also being applied to the NAM signal terminal within the interior of the monitor signal selecting means F. At this moment, when the zebra control signal $V_Z$ is inputted with high signal, since this signal can not make the diodes D2, and D5 within the zebra signal control means E to be conductive, said 4 bits counter integrated circuit IC1 and the comparators COMP2, COMP3, COMP4 are not operated, on the contrary, when the zebra control signal $V_Z$ is inputted with low signal, since this low signal is applied to the 4 bits counter integrated circuit IC1 and the input terminal R through the diode D2, at the same time, the sub-carrier voltage $V_C$ is inputted to the clock terminal CLK of said 4 bits counter integrated circuit IC1, wave form reduced to ¼ of the frequency of the sub-carrier is outputed to the terminal Q2 of the 4 bits counter integrated circuit IC1 in the 4 bits counter integrated circuit IC1, and the outputted wave form is inputted through a capacitor C5 and a resistor R15 to the collector terminal of the transistor TR8 within the switching circuit A and to the zebra terminal within the monitor signal selecting means F.

On the other hand, a voltage $V_{J'}$ from the output signal $V_J$ outputted from the operational amplifier OP1 within said video signal integrating means C being pertinently reduced by the variable resistor VR1 is inputted to the inversion (−) terminal of the comparator COMP1 in the zebra signal control means E.

Figure 2E:

At this moment, the comparator COMP1 compares the signal applied to the inversion (−) terminal of said comparator COMP1 and the NAM video signal $V_N$ outputted from said NAM video signal means B, and outputting the output wave from the compared difference voltage as shown in FIG. 2e through the output terminal of the comparator COMP1.

Figure 2F:
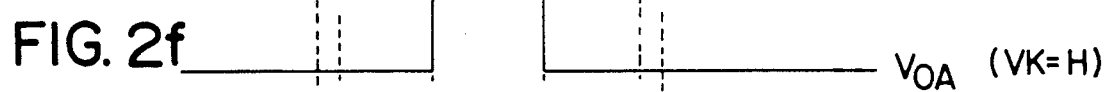

At this moment, if the auto white balance OK IND is not properly adjusted, since the output signal $V_K$ is made to be outputted with a high signal and this high signal makes the diodes D3, D4, and D6 non conductive, the comparator COMP1 is not operated, and when the output signal $V_K$ is outputted with a low signal at the time that the auto white balance OK IND is properly adjusted, since diodes D3, D4, and D6 become conductive, said 4 bits counter integrated circuit IC1 operates regardless of the zebra control signal $V_Z$ and the operation of the comparators COMP2, COMP3, and COMP4 are stopped, and compared output $V_{OA}$ as shown in FIG. 2f is outputted at said comparator COMP1. The resistor R31, capacitor C3, diode D7, and transistor TR8 within the switching circuit A, are controlled by said output signal $V_{OA}$, and switch the zebra output signal $V_{Q'}$.

On the other hand, in case the signal outputted from $V_K$ is a high signal and the zebra control signal $V_Z$ is a low signal when the auto white balance is not properly adjusted, the operation of the comparator COMP1 is stopped, on the contrary, the comparator COMP2 compares the voltage $V_2$ which is set at the variable resistor VR2 and the NAM video signal $V_N$ outputted from the NAM video signal means B, and compared output signal $V_{Q'}$ is applied to one side ① of the input terminals of each of the AND gates AND1, and AND4, the comparator COMP 3 compares the voltage $V_3$ set at the variable resistor VR3 and the NAM video signal $V_N$ and compared output signal $V_{Q''}$ is applied to one side ① of the input terminals of the AND gate AND2 and to the other side ② of the input terminal of the AND gate AND4, and the comparator COMP4 compares the voltage $V_4$ set at the variable resistor VR4 and the NAM video signal $V_N$, and compared output signal $V_{Q'''}$ is applied to the other side ② of input terminals of the AND gates AND3, and AND2.

Figure 2G:
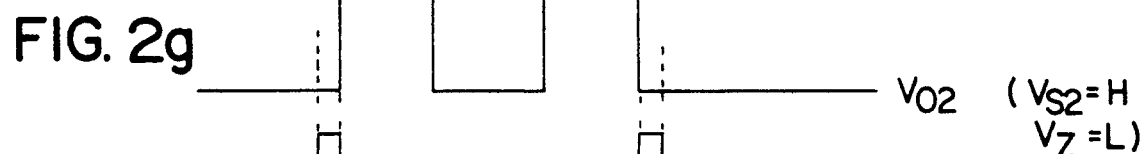
Figure 2H:
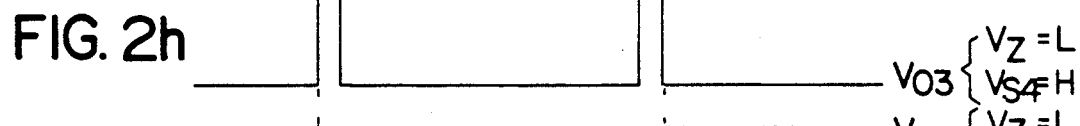
Figure 2I:

In this state, said AND gate AND1 logically multiplies the voltage $V_{Q'}$ outputted from the comparator COMP2 by the signal $V_{S1}$ selected from the band selecting switch SW1, and outputting the wave form as shown in FIG. 2f at the output terminal and applying to the input terminal ② of OR gate OR1, and said AND gate AND4 logically multiplies the output voltage $V_{Q'}$ outputted from said comparator COMP2 and the output voltage $V_{Q''}$ from the comparator COMP3 and the voltage $V_{S2}$ selected from the band selecting switch SW1, and outputting the wave form as shown in FIG. 2g and applying it to the input terminal ① of OR gate OR1. Therefore, the AND gate AND2 logically multiplies output voltages $V_{Q''}$, $V_{Q'''}$ outputted from the comparators COMP3, COMP4 and the signal $V_{S3}$ selected from the band selecting switch SW1, and outputting the wave form as shown in FIG. 2h and applying to the input terminal ③ of said OR gate OR1. AND gate AND3 logically multiplies the output voltage $V_{Q'''}$ outputted from the comparator COMP4 and the signal $V_{S4}$ selected from the band selecting switch SW1, and generates the wave form as shown in FIG. 2i, and applies it to the input terminal ④ of said OR gate OR1.

Figure 3A:
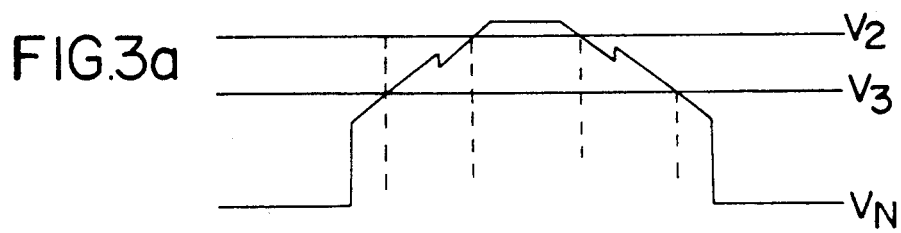
FIGS. 3a to 3e are wave form charts of the outputted zebra signal appearing between the V2 and V3 levels and executed at the zebra signal generating circuit of the present invention.
Figure 3B:
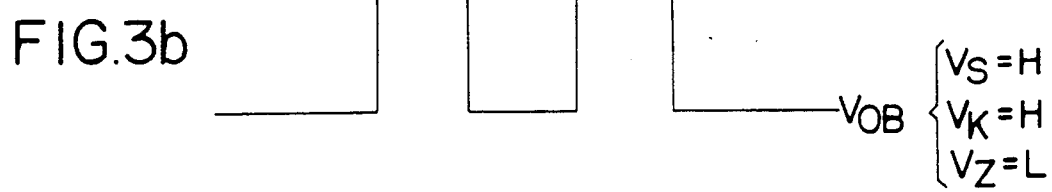
Figure 3C:

Thereafter, the OR gate OR1 logically summing these signals and the logically summed generated signal $V_{OB}$ as shown in FIG. 3b, is applied to the base terminal of the transistor TR8 through a diode D7, resistor R31 and capacitor C3, and the switching circuit A switches the zebra signal $V_Q$ as shown in FIG. 3c generated from said zebra signal generating means D and the output signal $V_{OB}$ outputted from said OR gate OR1, and inputting to the zebra terminal of the monitor signal selecting means F.

Thereby, the monitor signal selecting means F outputs the video view finder signal $V_V$ as shown in FIG. 3b.

Figure 3D:
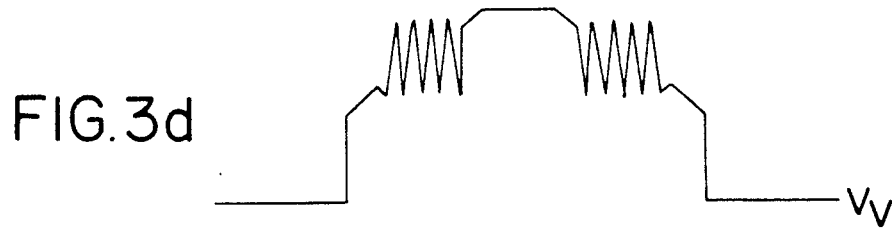

As shown in FIG. 3a the NAM video signal $V_N$ outputted from said NAM video signal means B is outputted with the output signal $V_{OB}$ of the OR gate OR1 as shown in FIG. 3b between the reference voltage $V_2$ and the reference voltage $V_3$ established by the resistors VR2 and VR3 within the zebra signal control means E and at this moment, the output signal $V_{OB}$ of said OR gate OR1 is in the high signal period, by switching the zebra signal $V_Q$ as shown in FIG. 3c generated from said zebra signal generating means D, the view finder signal $V_V$ FIG. 3d appears in the NAM video signal $V_N$ of the monitor signal selecting means F.

Figure 3E:

The wave form of FIG. 3e is the zebra signal outputted from said zebra signal generating means D.

Therefore, since the zebra signal appears between the reference voltages $V_2$ and $V_3$ on the electronic view finder, the camera condition and light quantity state can be easily discerned.

As described above, according to the present invention, the inputted video signal is amplified and the amplified signal is divided by bands and the zebra signal from the zebra signal generating means is switched to the divided band and the zebra signal is made to appear for to each such that the screen condition and light quantity state can be easily caught in each of the bands, serving as a basis for obtaining a good picture quality, and also having the convenient advantage of not being required to carry separate measuring instrumentation or a master monitor in order to measure the screen condition or light quantity in the field location.

Although a certain preferred embodiment has been shown and describe, it should be understood that many changes and modifications may be made therein without departing from the scope of the attached claims.

What is claimed is:

1. A zebra signal generating circuit of a video camera, comprising:
   video signal amplifying means for generating amplified red, green, and blue video signals;
   non-additive mixing video signal means for outputting a non-additive mixing video signal proportional to an average value of the red, green, and blue video signals utilizing the amplified red, green, and blue video signals from said video signal amplifying means;
   video signal integrating means for amplifying and successively integrating the green video amplified signal of the red, green, and blue amplified signals from said video signal amplifying means;
   zebra signal generating means for generating comb teeth pattern signals in response to reception of a control signal from a control terminal; and
   zebra signal control means for comparing the zebra signal with a reference voltage and generating the zebra signal in stages by controlling and switching through a logic circuit.

2. A zebra signal generating circuit of a video camera according to claim 1, wherein:
   the non-additive mixing video signal generated from said non-additive mixing video signal means and the signal integrated by said video signal integrating circuit means are compared with a reference voltage by stages.

3. A zebra pattern video signal control circuit, comprising:
   a plurality of comparators, wherein a first one of said comparators compares a non-additive mixing video signal with an integrated amplified signal and generates a first compared difference signal, a second comparator compares said non-additive mixing video signal to a first reference voltage and generates a second compared difference signal, and a third comparator compares said non-additive mixing video signal to a second reference voltage and generates a third compared difference signal and a fourth comparator compares said non-additive mixing video signal to a third reference voltage and generates a fourth compared difference signal;
   multiple bit counter means having a clock and clock terminal connectable to receive a sub-carrier voltage, and generate a signal reduced to one quarter of the frequency of said sub-carrier voltage;
   control means for controlling said plurality of comparators and said multiple bit counter means in response to control signals;
   a plurality of AND gates wherein a first gate of said plurality of AND gates generates an AND logically multiplied signal from said second compared difference signal and from a first output signal from a band selector switch, a second gate of said plurality of AND gates generates an AND logically multiplied signal from said third compared difference signal and from said fourth compared difference signal and from a third output signal from said band selector switch, a third gate of said plurality of AND gates generates an AND logically multiplied signal from said fourth compared difference signal and from a fourth output signal from said band selector switch, and a fourth gate of said plurality of AND gates generates an AND logically multiplied signal from said second compared difference signal and from said third compared difference signal and from a second output signal from said band selector switch;
   said OR gate means, for logically summing signals generated from said plurality of AND gates; and
   switching means for changing a switch conductivity in response to said zebra signal and a signal generated from said OR gate means and said first compared difference signal.

4. The circuit of claim 3, wherein said integrated amplified signal is generated from two integrating circuits and an amplifying circuit.

5. The circuit of claim 3, whereby said non-additive mixing video signal is generated from a plurality of transistors, wherein an amplified red video signal is an input on a base terminal of a first transistor of said plurality of transistors, an amplified green video signal is an input on a base terminal of a second transistor of said plurality of transistors, an amplified blue video signal is an input on a base terminal of a third transistor of said plurality of transistors;
   said non-additive mixing video signal is generated in response to said amplified red video signal and said amplified green video signal and said amplified blue video signal; and
   said non-additive mixing video signal is a voltage value proportional to the average value of said amplified red video signal and said amplified green video signal and said amplified blue video signal.

* * * * *